Jan. 9, 1934.   L. LAWRASON   1,942,480
METHOD OF AND APPARATUS FOR AGGLOMERATING

Filed May 21, 1930

INVENTOR:
LEVERING LAWRASON,
BY

ATTORNEY.

Patented Jan. 9, 1934

1,942,480

UNITED STATES PATENT OFFICE

1,942,480

METHOD OF AND APPARATUS FOR AGGLOMERATING

Levering Lawrason, Los Angeles, Calif., assignor to Petroleum Rectifying Company of California, Los Angeles, Calif., a corporation of California Application May 21, 1930. Serial No. 454,309

10 Claims. (Cl. 204—24)

My invention relates to the art of treating mixtures to separate the constituent parts thereof, and finds particular utility in the petroleum industry where the crude oil pumped from the wells is often associated with water to such an extent as to make it unsalable until the water content is reduced.

I have found that certain of these petroleum emulsions can be at least partially broken by passing vibratory waves therethrough. Such petroleum emulsions are usually conceived of as comprising a continuous oil phase in which the water droplets are suspended, these droplets being prevented from settling due to a film of emulsifying agent around each particle. This film must be ruptured before the particle will settle by gravitational force or before two similar water droplets will tend to unite. If two droplets thus unite, the film of emulsifying agent is stretched to spread over a larger water droplet, and the emulsion becomes less stable due to the greater tendency of the agglomerated water droplets to settle out. This desirable agglomerating action between water particles is obtained in my process, the reason therefor being not distinctly understood. I believe, however, that this desirable action takes place due to the mechanical displacement between adjacent water particles when vibratory waves are passed through the emulsion. This relative displacement apparently ruptures the film of emulsifying agent surrounding each droplet, and allows the droplets to agglomerate into drops of sufficient size to gravitate from the oil.

It is an object of this invention to provide a novel method of treating a petroleum emulsion by subjecting this emulsion to a rapid vibration whereby vibratory waves pass therethrough.

This step of passing vibratory waves through an emulsion finds particular utility in conjunction with electric methods of dehydration wherein the emulsion is subjected to a high intensity electric field. I have found the step of preliminarily vibrating the emulsion to somehow increase its treatability when subjected to an electric field, though the reasons therefor are not fully understood.

It is an object of this invention to provide a method of dehydrating petroleum emulsion by first subjecting the emulsion to a rapid vibrating action and subsequently subjecting it to the action of an electric field.

I have also found it very desirable to pass vibratory waves through the emulsion during the time that it is undergoing treatment in the electric field. The vibratory waves in this instance tend to prevent the formation of short-circuiting chains of water particles, or actually break up any of such chains which have already formed. This action apparently takes place due to the relative momentary displacement between adjacent water particles when the vibratory waves are passed through the emulsion.

It is another object of this invention to provide a method of treating emulsion by subjecting it to the action of an electric field and passing vibratory waves therethrough while the emulsion is in this field.

This process of passing vibratory waves through an emulsion also finds utility in assisting the gravitational separation of the agglomerated particles from the emulsion after electric treatment, and it is an object of this invention to provide a method of treating an emulsion by first subjecting it to the action of an electric field and subsequently passing vibratory waves therethrough to assist the settling of the water therefrom.

Other objects of the invention lie in the provision of novel apparatus for performing the above methods.

Still further objects and advantages of the invention appear in my co-pending applications Serial No. 122,386, filed July 14, 1926, and Serial No. 216,542, filed August 31, 1927, of which this application is a continuation in part.

Other objects and advantages of the invention will be made evident hereinafter.

Referring to the drawing,—

Figure 1:
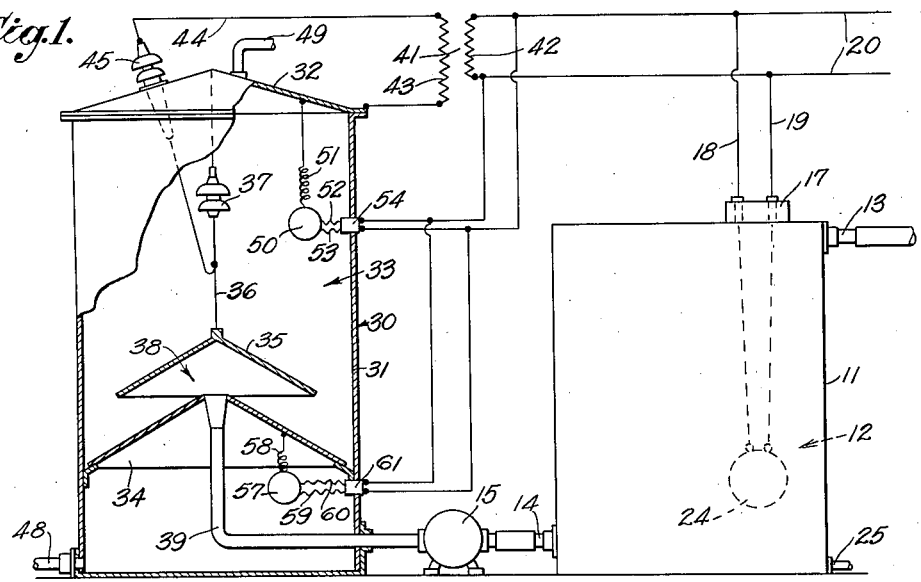
Fig. 1 is a diagrammatic view illustrating one form of apparatus for carrying out my method.

Referring particularly to Fig. 1, the treating apparatus therein shown comprises a pre-treating tank 11 providing a substantially enclosed pre-treating chamber 12 to which emulsion is supplied through a pipe 13, this emulsion being withdrawn through a pipe 14 connected to the intake end of a pump 15. Mounted in the upper wall of the tank 11 is an insulator 17 through which conductors 18 and 19 extend, these conductors being connected to a supply line 20 and extending downward in the pre-treating chamber 12 to supply electricity to an electric vibrator 24. This vibrator may be of any desired type which operates when current is supplied thereto to vibrate relative to the liquid in the pre-treating chamber 12 and thus set up in this liquid vibratory waves which pass entirely through this body of liquid.

Any water which is separated from the oil in the pre-treating chamber 12 settles downward therein and may be withdrawn through a pipe 25.

The emulsion after undergoing preliminary treatment is forced by the pump 15 into an electric dehydrator 30 comprising a tank 31, the upper end of which is closed by a dome 32, this tank providing a treating chamber 33 which is normally filled with liquid. In the type of dehydrator shown, a grounded electrode 34 of conical shape is mounted in the treating chamber 33 in spaced relationship with the tank 31. A live conical electrode 35 is supported a distance thereabove by a supporting means 36 including an insulator 37, the grounded and live electrodes 34 and 35 cooperating to form a treating space 38 which is in communication with the discharge of the pump 15 through a pipe 39 in the usual manner. During the time that the emulsion is forced into the treating space 38, an electric field is set up in this space by means of a transformer 41, this transformer providing a primary 42 connected to the supply line 20 and a secondary 43, one terminal of the secondary being connected to the tank 31 and the other terminal being connected to a conductor 44 extending through an insulator 45 mounted in the dome 32 and being electrically connected to the live electrode 35.

The apparatus thus far described I have found to be very useful when treating certain types of emulsion which appear to be especially susceptible to electric treatment after being vibrated in the pre-treating chamber 12. The emulsion passing into the space 38 is subjected to the action of the electric field and the water droplets thereof are agglomerated. After leaving this field the water drops to the bottom of the tank 31 and is withdrawn through a pipe 48, the dry oil rising in the tank 31 and being withdrawn through a pipe 49 communicating with the upper end thereof. With certain types of emulsion, this preliminary vibrating step increases the effectiveness of the electrical treatment many fold, and effects not only a more rapid but a more complete separation of the water from the emulsion than would otherwise be the case.

It is, however, usually desirable to pass vibratory waves through the emulsion during the time that it is in the electric field and after it has passed therethrough. In Fig. 1 I have shown one method of accomplishing this end, this figure illustrating a vibrator 50 resiliently suspended from the dome 32 by a coil spring 51, electricity being supplied to this vibrator through flexible leads 52 and 53 passing through an insulator 54 and being electrically connected to the supply line 20. The vibrator 50 may be of a type similar to the vibrator 24, and is adapted to vibrate when electrical energy is supplied thereto, thereby passing vibratory waves through the body of liquid in the treating chamber 33, these waves also passing through the emulsion undergoing treatment in the treating space 38 due to the fact that this treating space is in open communication with the liquid in the tank 31. It is sometimes possible to use a single vibrating means in the tank 31, but it is usually preferable to position another vibrator in that portion of the tank below the grounded electrode 34 due to the fact that this grounded electrode usually extends substantially across the tank 31. Such a second vibrator is indicated by the numeral 57 and is supported by a coil spring 58 from the grounded electrode 34 being supplied with energy through flexible leads 59 and 60 extending through an insulator 61 connected to the supply line 20.

The vibrator 50 thus primarily passes vibratory waves through the emulsion undergoing treatment in the treating space 38 and through the dry oil in the upper part of the tank. I have found that this vibration materially assists the separation of the water from the oil in the upper part of the tank 31. Similarly, the vibrator 57 functions primarily in sending vibratory waves through the liquid in the lower portion of the treating chamber 33, this liquid comprising a mixture of water and oil in the process of settling. The vibratory waves very materially increase the rate of settling of the water from the oil in this space.

Other types of vibrators may also be used. Thus, in Fig. 2 I have shown the emulsion in the pre-treating tank 11 as being vibrated by external means in the form of a vibrator 70, including a shoe 71 adapted to bear against the walls of the tank 11 in such a manner that these walls are vibrated when current is supplied through the vibrator 70 by conductors 72 and 73 connected to the supply line 20. It is usually desirable to mount the pre-treating tank 11 on resilient means when this type of vibrator is used thereby increasing the effectiveness of the action of this vibrator. Such a means is shown in Fig. 2 as comprising helical springs 75 positioned at each corner of the tank 11 in supporting relationship therewith.

Figure 2:
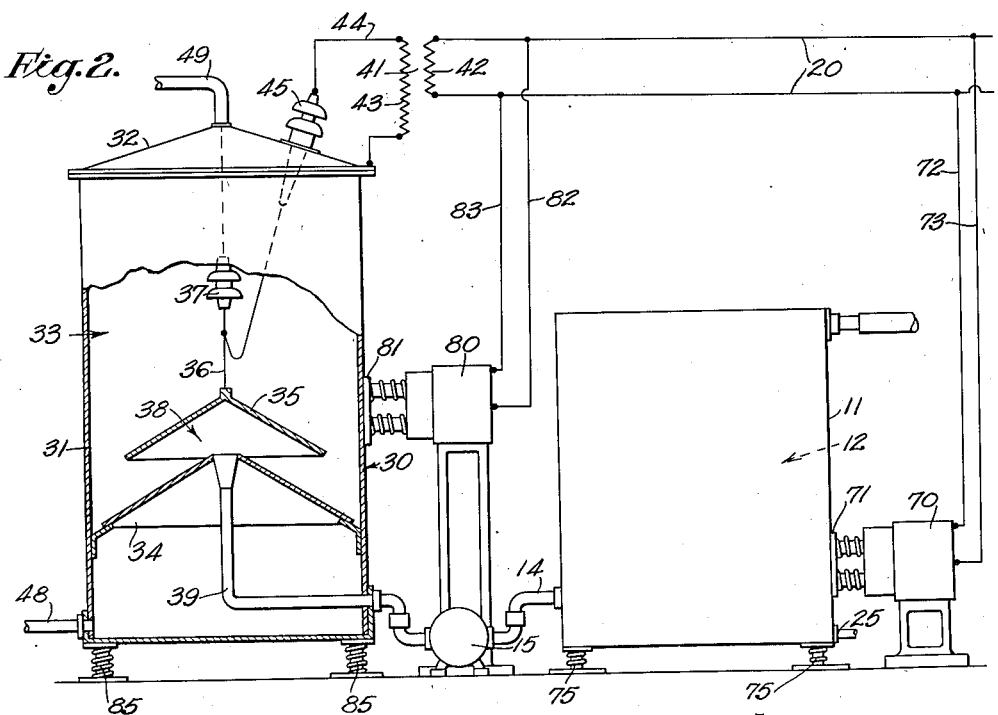
Fig. 2 is a diagrammatic view of another form of apparatus for carrying out my method.
Figure 2:

Similarly, in Fig. 2 I have illustrated the tank 31 of the dehydrator 30 as being vibrated by external means comprising a vibrator 80 including a shoe 81 contacting this tank in vibrating relationship, so that when current is supplied to the vibrator 80 through conductors 82 and 83 connected to the supply line 20 the tank 31 is vibrated, thereby passing vibratory waves through the liquid contained therein. It is also preferable to resiliently mount the tank 31 in using this form of the invention, this resilient mounting means being indicated by helical springs 85.

In some instances it is possible to entirely dispense with the pre-treater and supply the emulsion directly to the treating space 38, relying upon the vibratory waves passing therethrough to prevent any short-circuiting action between the electrodes 34 and 35. In this event the emulsion is vibrated during and after electrical treatment, thereby accomplishing the desirable results hereinbefore set forth. In other instances it is desirable to utilize the pre-treating tank, thus passing vibratory waves through the emulsion before, during, and after electric treatment. Furthermore, as pointed out above, it is possible to utilize the pre-treating tank and vibrator 24 to accomplish a preliminary separation of the water from the emulsion when certain types of emulsion are sent therethrough. In other instances this preliminary treatment does not accomplish any material separation of water in the pre-treating tank 11 but does cooperate with the electric field in the treating space 38 in producing a method of treatment which is much more efficient than treatment without this step of preliminarily vibrating the emulsion.

While I have shown and described two types of apparatus whereby vibratory waves may pass through the emulsion, it should be understood that I am not limited to these means; thus, while I have shown the vibrators as being electrically operated and usually find this to be desirable, it is also possible to use vibrators driven by other means, and mounted in different positions from those shown.

I claim as my invention:

1. In combination: a pre-treating tank; means for delivering a fluid to be treated to said pre-treating tank; means for passing vibratory waves through said fluid in said pre-treating tank; a dehydrator including a pair of electrodes defining a treating space; means for conducting said fluid from said pre-treating tank into said treating space; and means for passing vibratory waves through said fluid when in said treating space.

2. In combination: a pre-treating tank; means for delivering a fluid to be treated to said pre-treating tank; means for passing vibratory waves through said fluid in said pretreating tank; a dehydrator tank containing a body of liquid; a pair of electrodes in said tank and defining a treating space; means for conducting said fluid from said pre-treating tank into said treating space; and means for passing vibratory waves through said body of liquid.

3. In an apparatus for treating a fluid to separate suspended matter therefrom, the combination of: walls forming a pre-treating chamber; means for passing a rapid series of vibratory waves through a fluid bearing suspended matter and contained in said chamber; walls forming a treating chamber; means for conducting said fluid from said pre-treating chamber into said treating chamber; means for treating said fluid in said treating chamber to agglomerate said suspended matter; walls forming a settling chamber in communication with said treating chamber; and means for passing a rapid series of vibratory waves through said treated fluid in said settling chamber.

4. In an apparatus for treating a fluid to separate suspended matter therefrom, the combination of: walls forming a pre-treating chamber; means for passing a rapid series of vibratory waves through a fluid bearing suspended matter and contained in said chamber; walls forming a treating chamber; means for conducting said fluid from said pre-treating chamber into said treating chamber; means for electrically treating said fluid in said treating chamber to agglomerate said suspended matter; walls forming a settling chamber in communication with said treating chamber; and means for passing a rapid series of vibratory waves through said treated fluid in said settling chamber.

5. In combination in a dehydrator system: a pre-treating tank; means for supplying an emulsion to said pre-treating tank; a vibrator means associated with said pre-treating tank and passing vibratory waves through said emulsion therein; means communicating with the bottom of said pre-treating tank for withdrawing any water separated in said pre-treating tank; a dehydrator tank; means for setting up an electric field in said dehydrator tank; and means for delivering the emulsion treated in said pre-treating tank to said electric field to agglomerate the water droplets of said emulsion.

6. In combination: a tank containing a body of emulsion; inlet and outlet means communicating with said tank to respectively supply and withdraw said emulsion; an electric vibrator positioned in said body of emulsion in spaced relationship with the walls of said tank; flexible current supply means extending into said tank and supplying current to said electric vibrator to effect a rapid vibration thereof and send vibratory waves through said body of emulsion; and means for establishing an electric field in said tank to treat said emulsion during the time that said vibrator is in operation.

7. A combination as defined in claim 6 in which said vibrator is resiliently suspended in said emulsion.

8. In an electric treater, the combination of: a tank; a pair of electrodes in said tank and defining a treating space in which is established an electric field; means for supplying emulsion to said treating space, the treated emulsion flowing from said treating space and separating into its constituent phases in said tank; a vibrator in said tank above said treating space and passing vibratory waves through the lighter phase rising in said tank; another vibrator in said tank below said treating space and passing vibratory waves through the heavier of said phases, said treating space being in open communication with the interior of said tank whereby the vibratory waves set up by said vibrators pass through said emulsion undergoing treatment in said treating space; and means for withdrawing said phases from said tank.

9. In a treater, the combination of: a tank containing stratified bodies of oil and water; means for removing the oil from the top of said tank; means for removing the water from the lower portion of said tank; means for introducing an emulsion of oil and water into said tank; an electric vibrator positioned in the liquid in said tank and spaced from the walls of said tank; and current-supply means extending through the walls of said tank and supplying current to said electric vibrator to effect a rapid vibration thereof and thus send vibratory waves through the liquid in said tank to assist separation of said oil and water.

10. A method of treating an emulsion to separate the constituents thereof, which method includes the steps of retaining a large body of said emulsion in a tank in a relatively quiescent state; vibrating the said tank by applying to the exterior surface thereof a vibratory force while said emulsion is retained therein whereby vibratory waves are passed through said emulsion coalescing the heavier of said constituents, said coalesced constituent then dropping to the lower end of said tank; and separately removing said constituents from said tank.

LEVERING LAWRASON.